UNITED STATES PATENT OFFICE.

HEINRICH OPPERMANN, OF BERNBURG, GERMANY.

VOLATILE CHLORAL COMPOUND AND PROCESS OF MAKING SAME.

SPECIFICATION forming part of Letters Patent No. 650,022, dated May 22, 1900.

Original application filed January 23, 1899, Serial No. 703,060. Divided and this application filed June 12, 1899. Serial No. 720,316. (No specimens.)

*To all whom it may concern:*

Be it known that I, HEINRICH OPPERMANN, a citizen of the German Empire, residing at Bernburg, in the Duchy of Anhalt, Germany, have invented certain new and useful Improvements in Processes for the Production of Volatile Chloral Combinations Soluble in Alcohol; and I do hereby declare the following to be a full, clear, and exact description of the invention, such as will enable others skilled in the art to which it appertains to make and use the same.

This present application is a divisional one and a part of the application. Serial No. 703,060, filed January 23, 1899, for manufacture of new chloral combinations.

The present invention relates to a process of production of new combinations with chloral which are volatile and easily soluble in alcohol and possess extraordinary disinfecting properties.

It is known that menthol and terpineol combine with chloral under development of heat and that this combination is capable of dissolving bromin and iodin without, however, a combination taking place, in consequence of which the quantity of the dissolved bodies is proportionately small and their poisonous properties unchanged.

The object of the present invention is to produce combinations of bromin or of iodin with chloral in which the former are contained in quantities such as it has not been possible up to the present time to obtain, they being at the same time rendered nonpoisonous or harmless.

These new combinations are produced in the following manner: In the first instance combinations of a halogen, such as bromin or of iodin with menthol or with terpineol, or with both together, are produced and then treated with chloral of the formula $CCl_3CHO$ in the proportion of one equivalent of chloral to every equivalent of menthol or terpineol that had been used. In this way combinations are obtained which are volatile, soluble in alcohol, and possessed of extraordinary antiseptic powers. As an example, the following special application may be given: One hundred and fifty-six parts of menthol are caused to react on eighty parts of bromin or on one hundred and fifty of iodin. Menthol bromin being a very volatile body, the bromin process must be carried out very slowly and the liquids must be kept cool, while in the case of iodin and menthol the process is with advantage accelerated by a slight heating. This iodin or bromin combination with menthol is next treated with from one hundred to one hundred and fifty parts of pure chloral. Much heat is thereby evolved, almost as much as when pure menthol is mixed with pure chloral. The final product when treated with alcohol evolves no heat, thus proving that a complete combination of the bromin menthol or of the iodin menthol has taken place with the chloral. On the other hand, if a combination of menthol and chloral be mixed with bromin or iodin no solution is possible of the latter in the above quantities. There is also no heat generated when bromin or iodin is mixed with chloral menthol, which is a proof that the combination is different from that produced by treating bromin menthol with chloral.

A further proof that a real combination of the three bodies—iodin, menthol, and chloral—is formed is furnished by the fact that the product obtained by this new process is soluble in any quantity in alcohol, where it becomes almost totally decolorized if left standing for some time, while, on the contrary, when iodin is added to already-formed chloral menthol the color of the iodin remains unchanged if left standing for a long time.

To produce the said combinations in the form of powder, they may be mixed with magnesium hydrocarbonate powder or with magnesia hydrate powder, which they form under development of heat an equally-stable chemical combination.

I do not limit myself to the use of menthol or of bromin in carrying out this invention, as I may use their chemical equivalents in the process. In place of menthol I may use its chemical equivalent terpineol, and for the bromin I may use its chemical equivalent iodin.

Having now described my invention, I claim as new—

1. A process for the production of a chloral compound which consists in first treating bromin with menthol and then adding the chloral, substantially as set forth.

2. A process for the production of a chloral compound, which consists in first treating bromin with menthol, slowly and while keeping them cool, and then adding the chloral, substantially as set forth.

In testimony whereof I affix my signature in presence of two witnesses.

HEINRICH OPPERMANN.

Witnesses:
HENRY HASPER,
WOLDEMAR HAUPT.